Nov. 12, 1957 F. M. MORA 2,813,062
CONTINUOUSLY OPERATING LIQUID TAR CRACKING AND
HYDROCARBONS RECTIFYING EQUIPMENT
Filed Aug. 12, 1952 3 Sheets-Sheet 1
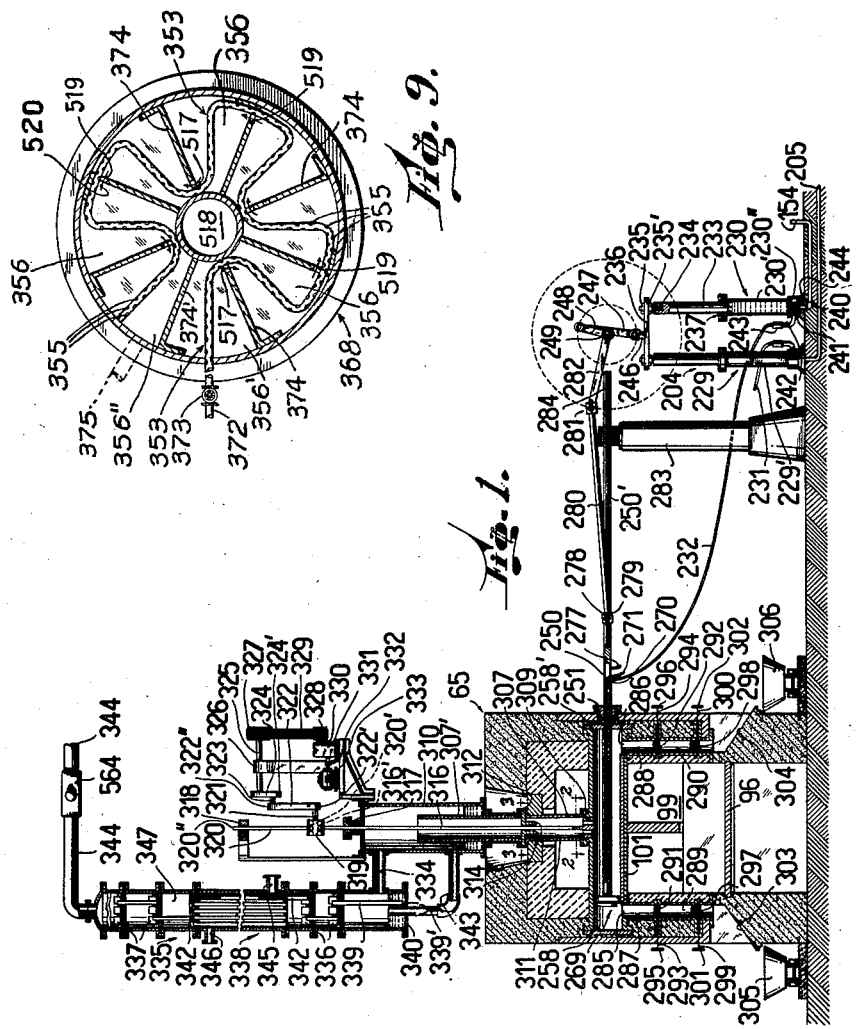
INVENTOR,
Fernando Mario Mora
BY
ATTORNEY

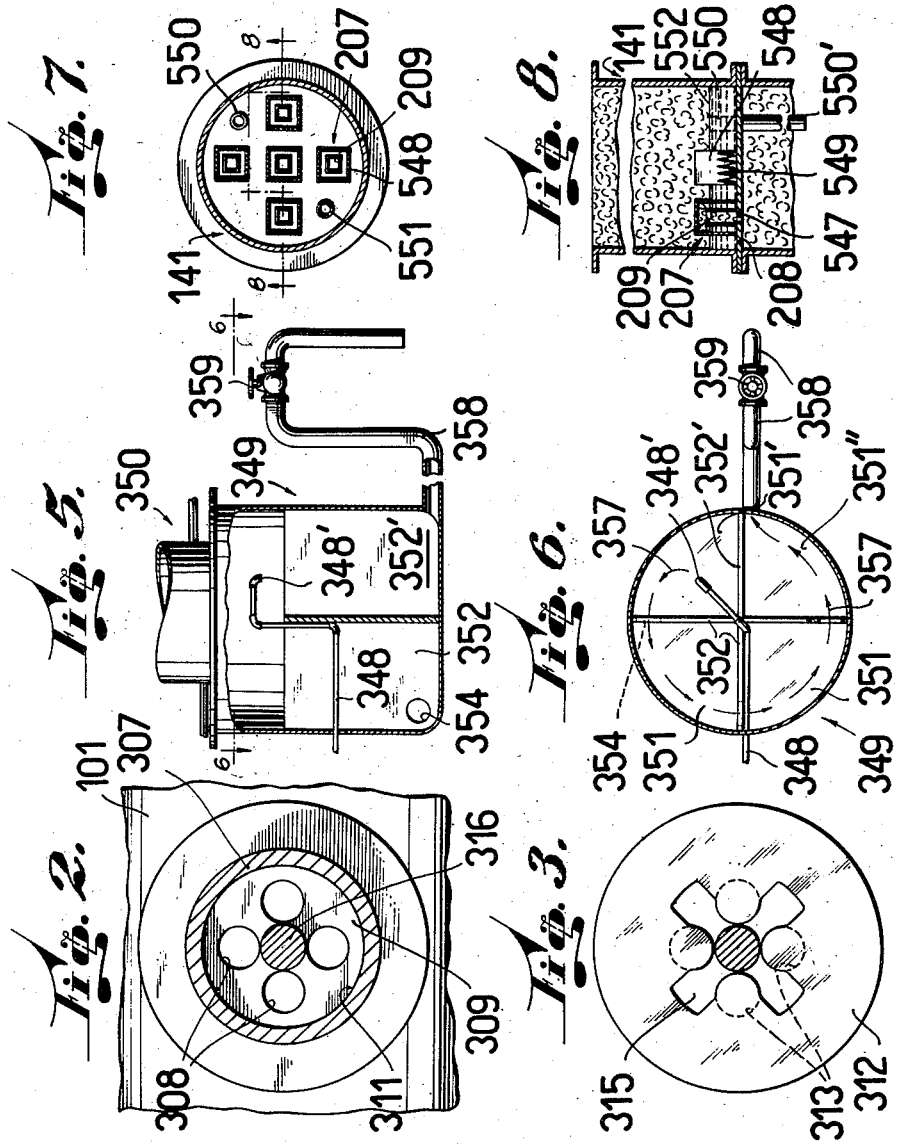

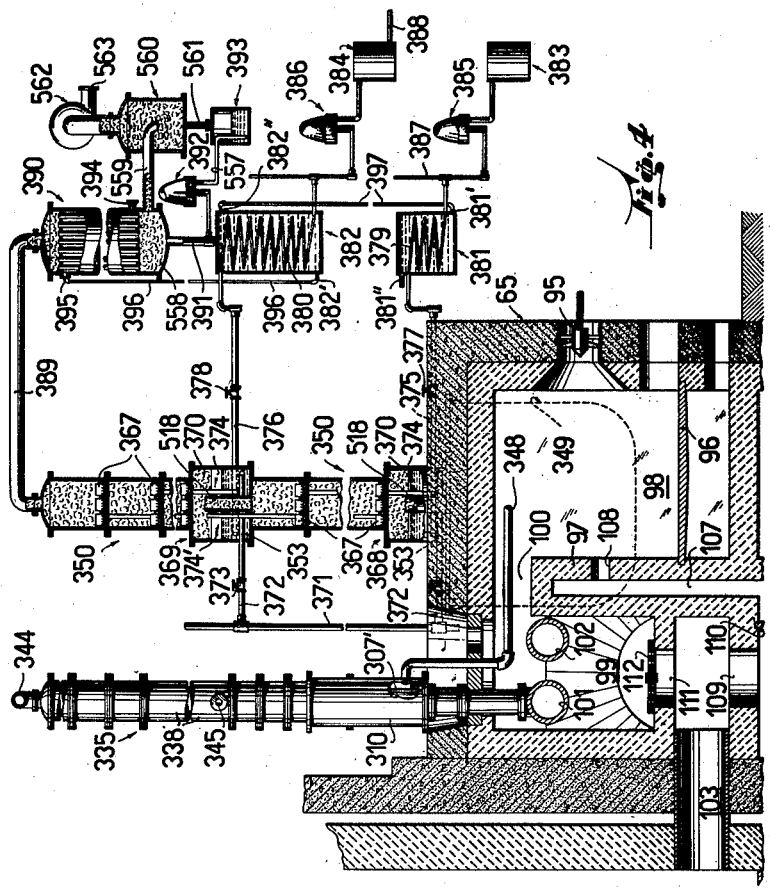

United States Patent Office 2,813,062
Patented Nov. 12, 1957

2,813,062

CONTINUOUSLY OPERATING LIQUID TAR CRACKING AND HYDROCARBONS RECTIFYING EQUIPMENT

Fernando Mario Mora, Buenos Aires, Argentina

Application August 12, 1952, Serial No. 304,025

4 Claims. (Cl. 202—3)

The present invention relates to a continuous method for the separation of the product produced by the cracking of vegetable tar into a plurality of products including pitch.

In known equipment for treating tar, which is usually obtained as a product in the carbonization of wood, the separated tar is subjected, by means of independent equipment, to distillation and re-distillation. In some cases, the re-distilled products are even purified. In some more developed plants, a cracking process is performed between the distillation and re-distillation operation. Generally, the tar cracking process is carried out with the aid of catalysts and high pressure.

One of the most important disadvantages of present methods used for the treatment of vegetable tar is that the heavy residues which are produced during distillation or cracking form a heat-insulating mass so that the residual mass must be eliminated when it reaches a given thickness. To this end the operation of the equipment used to treat the tar must be stopped while the aforementioned residual mass is removed which results in a costly loss of available heat, time and effort.

The present invention is directed to equipment capable of continuous operation without the necessity of frequent stoppage to thereby overcome the primary disadvantage of known equipment having similar purpose.

More particularly, the present invention relates to the collection of the thermal distillation products of tar, which are preferably produced by the intermittent thermal disintegration as taught herein, and for separating the pitch, the hydrocarbon acids, the neutral oils and the aromatic and aliphatic hydrocarbons which are contained therein.

More particularly, the present invention is directed to a method for the continuous separation of the gaseous product produced by the continuous cracking of vegetable tar into a plurality of products including pitch. The method is performed by equipment comprising, in addition to means for cracking tar, a dephlegmator, a conduit communicating between the cracking means and the dephlegmator and terminating therewithin at a point spaced from the bottom thereof so that liquid, including pitch, can collect in the dephlegmator, a condensing tower together with means to convey gas from the dephlegmator to the condensing tower and to return liquid condensed in the condensing tower to the dephlegmator.

Further, conduit means are provided to convey liquid collected in the dephlegmator to a boiler and a purifying tower is provided to separate the material boiled from the boiler into a plurality of products. Conduit means are also provided so that the pitch accumulating in the boiler can be withdrawn therefrom.

The invention includes control of the pressure in the condensing tower and in the purifying tower to permit proper operation of the equipment. The invention also includes the prevention of the accumulation of solid residue in the conduit communicating between the cracking means and the dephlegmator.

Other features included within the present invention will be apparent from the description of the invention.

An object of the invention is the provision of a method employing continuously operating equipment for the separation of the product produced by the cracking of vegetable tar into a plurality of products including pitch.

Another object of the invention is the provision of equipment as aforesaid in which means are provided to prevent the accumulation of solid or sticky residues to permit continuous operation to be maintained for long periods of time without the necessity of removing these deposits.

Still another object of the invention is the provision of equipment as aforesaid, and which equipment includes a condensing tower and a purifying tower, this equipment possessing a novel arrangement whereby the pitch contained in the cracked tar product is recovered without interfering with the proper operation of said towers.

Other and further objects of the invention will become apparent from the description which follows taken in conjunction with the accompanying drawings in which:

Fig. 1 is a longitudinal section of a tar cracking cylinder and includes equipment for supplying tar to be cracked and for collecting the crude product;

Fig. 2 is a section on the line 2—2 of Fig. 1;

Fig. 3 is a section taken on the line 3—3 of Fig. 1;

Fig. 4 is an end view, partly in section, and showing the purifying or hydrocarbon rectifying tower in relation to the tar cracking cylinder and the condensing tower, the driving unit for the piston which scrapes the conduit communicating between the tar cracking cylinder, the dephlegmator not being shown;

Fig. 5 is a side elevation, partly in section, of the boiler of the purifying tower shown in Fig. 4, the boiler being rotated 90°;

Fig. 6 is a section taken on the line 6—6 of Fig. 5;

Fig. 7 is a cross section taken through one of the bubble trays of the condensing tower;

Fig. 8 is a section on the line 8—8 of Fig. 7; and

Fig. 9 is a cross section of a stripping section of the purifying tower.

Referring to Figs. 1 and 4, tar is supplied to the tar cracking cylinder 101 by means of a supply pump 204 which also serves to supply calcium acetate liquor to the cracking cylinder 102 which forms no part of the present invention.

Heat for the cracking cylinders 101 and 102 is supplied by a furnace 65 which comprises a gas burner 95 provided with a grid 96 to enable the burning of lumps of wood should the gas burner 95 be incapable of providing sufficient heat as is the case when the plant is started. Furnace 65 is divided by a panel 97 into a combustion chamber 98, in which the gas burner 95 and the grid 96 are housed, and a heating chamber 99 is connected to combustion chamber 98 by a duct 100. The cracking cylinders 101 and 102 are housed in the heating chamber 99.

The furnace 65 is also provided with a pipe 103 and the panel 97 has an internal conduit 107 which connects combustion chamber 98 through the openings 108 and 109 with the pipe 103. A register 110 enables the flow of gases through the conduit 107 to be controlled. Heating chamber 99 is also connected to pipe 103 through an opening 111 provided with a register 112. By suitable setting of the registers 110 and 112, the flow of heating gases through pipe 103 may be duly controlled.

The supply pump 204 comprises two pumps 229 and 230 of substantially identical structure. Pump 229 is connected to the supply pipe 205 and to a flexible conduit 231 connected to the feeding device in the calcium acetate decomposition cylinder 102. Pump 230 is connected through pipe 154 and through flexible conduit 232 to the feeding device for the tar cracking cylinder 101.

As may be seen better in Figure 1, each pump 229 and 230 comprises a cylinder 229' and 230', respectively. The structure will be described with regard to pump 230. Cylinder 230' comprises a plunger 233 the upper end of which is connected to a stem 234. The free end portion of said stem 234 is linked by means of nuts 235 and 235' to a cross-bar 236, a stuffing box 237 seals the inside of pump 230 from the outside and enables the passage of plunger 233. The base 230" of pump 230 has a central bore provided at its inner end with a seat for a ball 240 arranged in a cage 241 forming a check valve. A duct 242 is connected to the base 230" of cylinder 230'. A check valve 243 links duct 242 with the flexible conduit 232.

The cylinder 230' is mounted on a base 244 through which pipe 154 passes. Said pipe 154 connects said pump 230 with a tank containing tar (not shown).

The cross-bar 236 has in its middle portion a projection 246 to which a connecting rod 247 is coupled, the other end of which is coupled to a crank 248 driven by driving shaft 249. It will be understood that upon rotating the driving shaft 249 the cross-bar 236 rises and falls and with it plunger 233 which in its upward movements draws a given volume of liquid tar through pipe 154 and check valve 240. During the admission stroke above described, check valve 243 stops the return of liquid contained in flexible conduit 232 and connected devices, back to the cylinder 230.

During the return stroke or downward movement of plunger 233, the liquid in cylinder 230' will be ejected through duct 242 and check valve 243 into flexible conduit 232 and at the same time, check valve 240 will be closed.

Referring now more specifically to the tar cracking cylinder 101 and its cracking device housed at least partially in the heating chamber 99, this tar cracking cylinder 101 is similar in structure to the calcium acetate decomposition cylinder 102 and this structure is shown and the subject matter is claimed in my copending application Ser. No. 304,023, filed August 12, 1952, now Patent No. 2,794,838, the structure constituting an improvement over the cracking construction described in my prior Patent No. 2,621,150. The cylinder 101 has a piston 269 comprising a hollow stem 250 which enters the cracking cylinder 101 through stuffing box 251.

The hollow stem 250 is provided with an opening 270 at a portion outside the cylinder 101 at a point which does not enter said cylinder irrespective of the position of the piston 269.

The flexible conduit 232 enters the hollow portion of stem 250 through the opening 270 and a refrigerating duct 271 is provided to receive crude acetone for the purpose of cooling the stem and prevent premature heating of tar suplied through the flexible conduit 232. The crude acetone leaves the stem 250 through the pipe 277.

The wear piece 256 is formed of a bar 255 provided with a slot 254 in its lower face 255'. Said slot 254 is complementary to the rail 260. Said bar 255 is provided at each end with supporting projections 257 and 261, respectively, which are linked to the lower part of the disk 252 by means of a plurality of bolts 268 which pass through perforations 259.

The front face 262 of disk 252 is a supporting surface for a residues scraper 263 the free edge 264 of which is in scraping contact with the inside surface 265 of cylinder 101.

An atomizing head 266 (see also Figure 9) is also supported by the disk 252 by means of a plurality of bolts 267 which also pass through scraper 263 which is further fixed to the lower part of said disk 252 by bolts 268. At least one longitudinal perforation 553 connects the front face 262 with the back face 554 of piston 269.

The hollow stem portion 250 is provided at a portion outside cylinder 101 and at a point which does not enter into said cylinder 101 even if piston 269 reaches the dead center corresponding to opening 270 of its stroke. Piston 269 is formed of an assembly of elements shown in detail in Figure 7, most of which have already been described.

The flexible conduit 232 enters into the hollow portion of stem 250 through opening 270 through which also enters a refrigerating duct 271. The flexible conduit 232 is obviously replaced by a rigid conduit 232' in the portion inside stem 250. Said conduit 232' passes through scraper 263 by a perforation 272 and enters a semicylindrical space 273 formed by the atomizing head 266 and the scraper 263. Said semicylindrical space 273 is provided at its periphery with a plurality of spaced nozzles 274 which enable the ejection of the vegetable tar through said nozzles 274 by plunger 233 during its downward stroke, which tar is ejected into the interior of cylinder 101 and more particularly on the internal wall 265. To this effect the inclined portion 275 of scraper 263 is a directing screen for the tar ejected by the nozzles 274. The remaining back part 250' of stem 250 which is the part behind opening 270 is preferably solid and supports a cross-pin 278 partially housed in bearing 279 integral with one end of connecting rod 280, the other end of which forms a link 281 with a crank 282 driven by driving shaft 249. A supporting and sliding guide 283 for stem 250 is provided between the free outer end 284 of the solid part 250' and the cross-pin 278.

It will be understood from the above that when driving shaft 249 is driven, the cross-bar 236 forming part of pump 204 and the piston 269 by means of its stem 250 and a similar piston housed in the calcium acetate decomposition cylinder 102, because cross-pin 278 relates both stems to each other, will be driven simultaneously.

As may be best seen in Figure 1, cylinder 101 projects out of heating chamber 99 at both ends, which are closed by cover plates 258 and 258'. Each of said projecting parts have in their bottom sections, openings 285 and 286 to which sinks 287 and 288, respectively, are connected, having corresponding antechambers 289 and 290, separated by panels 291 and 292, operable by means of screws 293 and 294, provided with hand wheels 295 and 296, respectively. The antechambers 289 and 290 are isolated from the outside by means of discharge panels 297 and 298 operable by means of screws 299 and 300 provided with hand wheels 301 and 302, respectively.

Sinks 287 and 288 collect carbonaceous residues which are discharged by piston 269 and when said sinks 287 and 288 are full with residues the said residues are passed to the antechambers 289 and 290 by operating hand wheels 295 and 296, respectively; once said residues have been discharged into the respective antechambers the panels 291 and 292 are closed again and the discharge panels 297 and 298 are opened, whereby said residues are discharged through channels 303 and 304 into carriages 305 and 306 forming preferably part of a train (not shown). The gases produced during the cracking action leave cylinder 101 through exit duct 307 and pass through opening 308 of a scraper piston 309 (see also Figure 2) to a dephlegmator 310 in which the heaviest parts or portions are condensed. The scraper piston 309 is provided in order to scrape the internal wall 311 of exit duct 307, because when the gases leave the cylinder 101 through said duct 307, an immediate coking is produced due to difference in temperature, and the residues will adhere to the internal wall 311 as well as to the wall defining the perforations 308 of scraper piston 309. A panel 312 is provided with an equal number of projecting pins 313 capable of penetrating into the opening 308 of the scraper piston 309. These projecting pins are each provided with a scraper end 314; a cruciform conduit 315 connects the space formed by the exit duct 307 with a prolongation 307' which enters into the dephlegmator 310. The scraper piston 309 is mounted on a stem 316, the upper end 316' of which projects to the outside passing through stuffing box 317. The upper end 316' is housed in a bearing 319 to which is also coupled the lower end 320' of a rod 320, the upper end 320" of which is guided by a stationary guide 318. A shaft 321 partially housed in bearing 319 is connected to the lower end portion 322′ of an oscillating bar 322 the upper end 322″ of which is coupled to a shaft 323 also connected to the free end 324′ of an eccentric 324 mounted on a shaft 325 supported by a stationary bearing 326 and provided with a transmission pulley 327 connected to a pinion 328 by means of several V-belts 329. The pinion 328 is mounted on a shaft 330 forming part of a speed reducer 331 connected through a coupling 332 to an electric motor 333. It will be understood that upon rotating the electric motor's driving shaft, it will transmit its movement to the speed reducer 331, pinion 328, V-belts 329, pulley 327, shaft 325 to eccentric 324. The oscillating bar 322 will transform said rotary movement into an oscillating rectilinearly alternative movement, whereby stem 316 guided by rods 320, will move up and down. The movements of said stem 316 and its scraper piston 309 are synchronized with the movements of piston 269, so that the upper dead end of the stroke of the scraper piston 309, that is to say when it is in contact with or at least adjacent to panel 312, corresponds to the end of the working stroke of piston 269, and the lower dead end of the stroke of the scraper piston 309 corresponds to the starting point of the working stroke of piston 269.

Therefore during the working stroke of piston 269, the scraper piston 309 rises and the scraper ends 314 will clean the scraper piston 309, when it reaches its upper end position and more particularly said scraper end 314 will clean the openings 308 whereby the scraped off, mainly carbonaceous, residues will fall into cylinder 101.

When piston 269 starts its scraping stroke, the scraper piston 309 will start its scraping action, discharging the residues always into the tar cracking cylinder 101 and the piston 269 will transport the part of the scraped off residues of exit duct 307, which residues have been scraped off before piston 269 reaches the exit duct 307, to the sink 287. Whilst the piston 269 continues its scraping stroke towards the cover 258, and once it has passed the portion corresponding to the opening of exit duct 307, the scraper piston 309 will continue its scraping downward movement and discharge the scraped off residues into cylinder 101 behind the piston 269. When the piston 269 starts its next working stroke, the said last mentioned residues will be transported towards sink 288, where they will be discharged in the way already explained.

The vapors and gases which have been formed in the cracking cylinder 101 and which have entered into dephlegmator 310 leave the latter through the upper part and more particularly through connecting pipe 334 to enter into a condenser tower 335. Said tower consists of a plurality of lower bubble trays 336 and a plurality of upper bubble trays 337 separated by a multitubular condenser 338.

The sections of bubble trays 336 and 337 comprise a plurality of individual bubble trays 207 which are shown in Figs. 7 and 8. Each bubble tray 207 is mounted on a platform 208 and contains a plurality of ducts 209, preferably of rectangular cross section, which are aligned with corresponding openings 547 formed in the platforms 208. Each duct 209 is provided with an inverted cup 548 of greater height than the height of the part of duct 209 emerging from the corresponding platform 208, the cups 548 surrounding the ducts 209 and being supported by the platforms 208.

The base of the cups 548 is zig-zag in shape to provide openings 549 for the egress of liquid which is accumulated within the inverted cups 548. The zig-zag openings 549 provide a large contact surface for the liquid in the cups 548.

Conduit 550 passes through the platform 208 and the top of conduit 550 is below the ducts 209. The lower end 550′ of conduit 550 opens in the underlying bubble tray 207 adjacent the platform 208 thereof. Similarly, a conduit 551, shown in Fig. 7, connects the bubble tray immediately above the one shown in Figs. 7 and 8 with the one shown in these figures.

The gases and vapors which rise through the rectangular ducts 209 are partially condensed when they strike the inverted cups 548 and the gases and vapors which are not condensed leave the openings 549 while the condensed portions will in course of time form a liquid level which as a maximum may reach the height indicated by reference numeral 552, because when the liquid level tends to rise further, the liquid is discharged to the immediate lower bubble section. It can thus be understood that the non-condensed gases, when leaving the inverted cups 548 through the openings 549 have to bubble through the liquid accumulated on said platform whereby said gases are washed before entering the ducts 209 of the following upper section of bubble trays 207.

The condensed fraction which in other words is the liquid portion, continues its downward movement through the conduits 550 until it reaches the boiler 214 to which reference will be made later on. Duct 339 which discharges the condensed liquid of the last section of lower containers 336, is of such a length that its discharge opening 339′ is located adjacent the base 340 of the condenser tower 335. A duct 342 connects the lower part of the upper bubble containers 337 with the upper part of the lower bubble containers 336. A backflow pipe 343 connects the base 340 with the dephlegmator 310.

A pipe 344 enables the discharge of the gaseous head products from the condenser tower 335.

The multitubular condenser 338 receives its refrigerating water through duct 345 and discharges it through duct 346. The refrigerating water supply source is not shown.

The gases and vapors which enter the condenser tower 335 through duct 334 pass, in the embodiment shown to the lower bubble container section 336 where the condensed liquids will remain, whilst the remanent gases and vapors will pass through the multitubular condenser 338, where the gases are subjected to a complete cooling action and are cold when bubbled in the chamber 347, and since said gases still contain some hydrocarbons, specially those of low distilling points, they are forced to bubble again in the upper section of bubble containers 337, in order to eliminate the last traces of hydrocarbons, which they may have entrained.

The condensible gases are discharged through pipe 344 and the condensed liquids, mainly the aromatic hydrocarbons, the acyclic hydrocarbons of the saturated series and the hydrocarbons of the ethylene series move downwards through duct 342, the lower bubble container section 336, and duct 339 to enter through the backflow pipe 343 the dephlegmator 310. The backflow of these cold liquids refrigerates the prolongation 307′ of the exit duct 307, whereby coking of the heavy parts which rise in said prolongation 307′, is avoided. Precisely due to these facts, it is not necessary that the scraper piston 309 cleans also the internal walls of the prolongation 307′.

These liquids supplied by the backflow pipe 343 are heated up in the dephlegmator 310 and leave the latter through discharge pipe 348. This discharge pipe 348 passes through the upper part of heating chamber 99, duct 100 and combustion chamber 98 where it is preheated to approximately 120° C. and thereafter enters the central part of boiler 349 of the purifying tower 350 (see also Figures 5 and 6) which is arranged in another furnace. The boiler 349 is subdivided into a plurality of chambers 351 formed by a plurality of panels 352 provided with perforations 354 which connect the chambers 351 formed by said panels 352.

The discharge end 348′ of the discharge pipe 348 opens into the first chamber 351′ separated from the last chamber 351″ by a panel 352′ without any opening.

The hydrocarbons which are discharged by the discharge end 348′ and which fall into the first chamber 351′ are forced to follow the path through all the chambers 351, as indicated by arrows 357 to reach the last chamber 351″ where they enter the discharge pipe 358 provided with a control valve 359. During this movement, the volatile products will be separated and will rise in the purifying tower 350, due to the continuous movement of the liquid mass when passing through that plurality of chambers 351. Thus the last chamber 351″ contains, practically, only pitch which is discharged through discharge pipe 358.

The evaporated liquids in the boiler 349 rise in the purifying tower 350 (see Figure 4), which is provided with a plurality of bubble trays 367 of a structure similar to that of the bubble containers of the condenser tower 335.

The purifying tower 350 is provided with a lower stripping section 368 and an upper stripping section 369 in which the different portions, which will be thereafter accumulated are stripped or purified.

In the part of the plant now under consideration or in other words, the stripping sections 368 and 369 (see also Figure 9) steam is supplied to each chamber 370 from pipes 371 and 372 through a valve 373 and a coil 353 provided with openings 355 which enable the steam to be injected into the said chambers 370, which are subdivided in the lower part by means of a plurality of panels 374 whereby a plurality of lower chambers 356 is formed. Said panels 374 are provided alternatively with openings 517, adjacent the central duct 518 through which the vapors and gases rise and enter into the chamber (see also Figure 4) and with openings 519 adjacent the periphery of the respective stripping sections 368 and 369. These openings 517 and 519 are arranged alternately so that the heating coil 353, which pass through the opening adopts an undulating or zig-zag shape and the liquid, which is precipitated into the chambers 356, follows the same path as indicated by arrows 520. A panel 374′ separates the first lower chamber 356′ from the last lower chamber 356″ connected to the discharge duct 375.

Thus the condensed products, which have to follow the undulating path in the lower stripping section 368 and the upper stripping section 369 are subjected to heating and distillation which assures that the volatile products will rise before the liquid hydrocarbons leave the lower stripping section 368 through the discharge pipe 375 and through the upper discharge pipe 376 the upper stripping section 369. It is important to maintain a constant temperature in the stripping sections 368 and 369 in order to collect always the same hydrocarbons as will be immediately explained.

Both discharge pipes 375 and 376 are provided with control valves 377 and 378, respectively. These pipes 375 and 376 are connected to cooling coils 379 and 380, respectively, each arranged in a cooling tank 381 and 382, wherefrom the hydrocarbons are discharged in liquid state into schematically shown storage tank 383 and 384 passing previously through the control test tubes 385 and 386, respectively. The way in which said cooling coils 379 and 380 are refrigerated, will be explained later on.

As is well known, the control tubes are all provided with a breather tube such as tube 387 in the control tube 385, which is connected to atmosphere whereby the generation of a back or a counterpressure in the discharge pipe is avoided.

The lower storage tank 383 (only schematically shown) will collect the products which are within 120° C. and 150° C. approximately, which form the acid hydrocarbon compounds mainly formed of phenol, cresol, crecineol and cineol.

Storage tank 384 (only schematically shown) corresponding to the middle portion of the purification tower 350, will collect the products mainly formed of neutral oils with distilling point approximately between 150° C. and 180° C. These neutral oils are again subjected to cracking in the tar cracking cylinder 101, to which end, pipe 388 leads said neutral oils to storage.

The uncondensed products leave the upper part of the purifying tower 350 through pipe 389 and enter a multitubular condenser 390 in which the head products are cooled off and condensed and are discharged through pipe 391, control tube 392, discharge pipe 557 into schematically shown storage tank 393.

The discharge pipe 557 as well as the similar pipe of control tubes 385 and 386 opens into the respective storage tank 393, 384 and 383 near the bottom thereof. The multitubular condenser 390 is provided in its lower chamber 558, besides pipe 391, with another tubular connection 559 which enters a dephlegmator 560. A discharge pipe 561 for the liquid parts which may have been entrained, connects said dephlegmator 560 with the storage tank 393. The upper part of dephlegmator 560 is connected to a suction fan 562, the discharge opening 563 of which is directly connected to atmosphere.

Returning now to the condenser tower 335 (see Figure 1) the gaseous discharge pipe 344 of said tower is provided with a pressure regulator 564 schematically shown and well known and intended to control the pressure on both its sides and more particularly the pressure in the condenser tower 335 and in the dephlegmator 310.

Considering now the assembly of the dephlegmator 310, discharge pipe 348, boiler 349 and purification tower 350, as far as its operative aspect is concerned, the following has to be pointed out:

The boiler 349 is heated by means of a furnace whereby the volatile parts rise from the remaining pitch, and thus a pressure is generated in the boiler 349 which tends to stop the discharge of the liquid delivered by discharge pipe 348 connected to dephlegmator 310. In order to overcome this difficulty the pressure regulator 564 is provided, which assures that a certain pressure is maintained in dephlegmator 310 on the liquid in said dephlegmator 310, which pressure is able at least partially to counteract the pressure existing in boiler 349. However, sometimes the pressure which is generated in the boiler 349, is too high in relationship with the pressure existing in the dephlegmator 310, and therefore the dephlegmator 560 with the suction fan 562 is provided, which cooperates in assisting the gases to rise in the boiler 349 and purifying tower 350, whereby the pressure in said boiler 349 is sufficiently reduced to assure the free discharge of liquids through discharge opening 348′. It is therefore important to correctly balance the operative power of the suction fan 562 and the pressure regulator 564.

The hydrocarbons stored in the storage tank 393 consist of acyclic hydrocarbons of the saturated series, saturated hydrocarbons of the polymethylene series and benzene hydrocarbons.

The multitubular condenser 390 receives its refrigerating water from a source, not shown, which supplies it through supply pipe 394. The used water is discharged through discharge pipe 395 and enters pipe 396 which delivers it to the lower end 382′ of the cooling tank 382, the used water being discharged through the upper end 382″ from which it is supplied through pipe 397 into lower end 381′ of refrigerator or cooling tank 381 and is finally discharged at the upper end 381″. Thus the same cooling water is used for successive steps, which is possible due to the fact that the temperature in the multitubular condenser 390 and cooling tanks 382 and 381 increases progressively.

I claim:

1. In the continuous cracking of vegetable tar and separation of the cracked product into a plurality of products including pitch, the improvement comprising passing the cracked product into a dephlegmator zone in indirect heat exchange relation with the pitch collected in said dephlegmator zone, passing the vapors in said dephlegmator zone to a condenser, returning liquid condensed in said condenser to said dephlegmator for collection therein with said pitch to dilute said pitch and cool the same, passing the diluted pitch from said dephlegmator to a boiler, heating said diluted pitch in said boiler to vaporize the low boiling components of said diluted pitch, purifying said low boiling components and withdrawing the pitch accumulated in said boiler.

2. The method recited in claim 1 in which the diluted pitch passing from said dephlegmator to said boiler is maintained at elevated temperature while in transit.

3. The method recited in claim 1 in which said diluted pitch is progressively concentrated before withdrawal thereof from said boiler.

4. The method recited in claim 1 in which suction is applied to reduce the pressure in said boiler and facilitate volatilization of said low boiling components.

References Cited in the file of this patent

UNITED STATES PATENTS

| Number | Name | Date |
|---|---|---|
| 1,199,147 | Baldwin | Sept. 26, 1913 |
| 1,304,212 | Slocum et al. | May 20, 1919 |
| 1,418,885 | Schulze | June 6, 1922 |
| 1,697,738 | Suida | Jan. 1, 1929 |
| 1,831,887 | Sieck | Nov. 17, 1931 |
| 1,911,909 | Maruhn et al. | May 30, 1933 |
| 1,911,992 | Coubrough | May 30, 1933 |
| 1,940,893 | Tiddy | Dec. 26, 1933 |
| 1,942,374 | Miller | Jan. 2, 1934 |
| 1,947,577 | Baklke et al. | Feb. 20, 1934 |
| 1,952,020 | Miller | Mar. 20, 1934 |
| 1,974,295 | Alther | Sept. 18, 1934 |
| 1,976,243 | Miller | Oct. 9, 1934 |
| 2,092,528 | Coubrough | Sept. 7, 1937 |
| 2,101,641 | Cooke et al. | Dec. 7, 1937 |
| 2,621,150 | Mora | Dec. 9, 1952 |
| 2,704,742 | Petrich | Mar. 22, 1955 |

FOREIGN PATENTS

| Number | Country | Date |
|---|---|---|
| 110,413 | Great Britain | Oct. 25, 1917 |
| 461,812 | Germany | June 18, 1928 |